T. I. PITT.
Gas-Meter Register.
No. 18,648.
Patented Nov. 17, 1857.
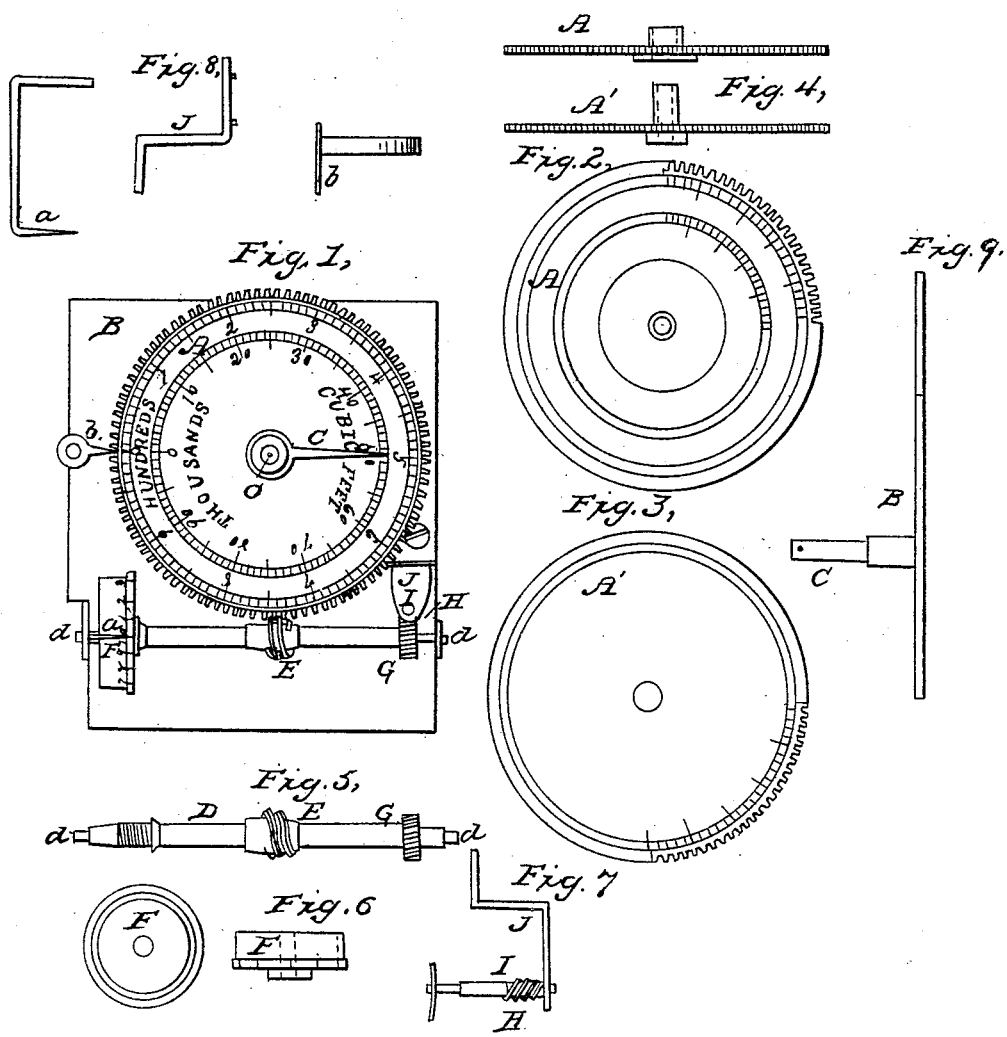

UNITED STATES PATENT OFFICE.

THOMAS I. PITT, OF NEW YORK, N. Y.

GAS-METER INDICATOR.

Specification of Letters Patent No. 18,648, dated November 17, 1857.

*To all whom it may concern:*

Be it known that I, THOMAS I. PITT, of the city, county, and State of New York, have invented a new and Improved Indicator for Gas-Meters; and I do hereby declare the following to be a full, clear, and exact description thereof, reference being had to the accompanying drawings, figures and letters of reference thereon, making part of this specification.

Heretofore gas meters have been of a complex nature requiring long trains of wheels and pinions in order to obtain the required slow movement.

The object of my invention is to obviate these difficulties and render an indicator a cheap, simple compact instrument by means of a rotary dial worked by endless screws which derive their motion from the drum of the meter.

To enable others skilled in the art to make and use my invention I will proceed to describe its construction and operation.

Of the said drawings Figure 1 is a front elevation. Fig. 2 shows the dial detached from the indicator. Fig. 3 denotes another wheel the same as Fig. 2 but having one more tooth. Fig. 4 shows edge views of these wheels. Fig. 5 shows the shaft and endless screw for working the wheels detached. Fig. 6 shows the wheel for registering the cubic feet disconnected with the shaft. Fig. 7 shows the shaft connecting with the drum of the meter and deriving its motion therefrom. Fig. 8 shows parts in detail. Fig. 9 shows the base plate and axis for the rotating dials.

Similar letters of reference indicate like parts in all the drawings.

I take a plate of brass or other metal B, and insert therein the axis C, for the wheels A, and $A^1$. The wheel A is the registering dial which shows the tens, hundreds, and thousands in cubic feet. To the drum of the meter is securely attached the shaft I, working in proper bearings in the plates B and J, as plainly shown. On this shaft there is an endless screw working into a pinion G, on the shaft D. This shaft has proper bearings at $d$, $d$, formed in pieces projecting sufficiently high to place the shaft in the proper position for the endless screw E, which is secured thereon to work the wheels A and $A^1$. At one end of the shaft D, there is placed a small registering wheel to indicate the cubic feet of gas consumed.

Operation: Motion being given the endless screw H on the shaft I, it imparts a motion to the shaft D, and registering wheel F which is secured thereon, the ratio of which movement is ten to one; for the screw H will perform ten revolutions to one of the wheel F, which will indicate ten feet of gas. The dial A will make one revolution for one hundred of the wheel F, which indicates one thousand feet of gas, while the wheel $A^1$, which I would here remark has one more tooth than the wheel A, makes one hundred revolutions for one hundred and one of the dial, which indicates one hundred thousand feet of gas which is shown by the pointer $c$ moving with the wheel $A^1$. The figures on the small wheel as before remarked indicate single cubic feet which is shown by the point $a$. The short marks or spaces near the periphery at the dial A show the tens, while the points opposite the figures and midway betwen them show the hundreds by the point $b$, while the spaces on the inner circle indicate the thousands, and the points projecting toward the center show the tens of thousands, which are indicated by the pointer $c$ moving with the wheel $A^1$, which passes over a space for every one hundred revolutions of the wheel A.

Having thus described my invention what I claim and desire to secure by Letters Patent is—

The employment of a rotary indicator constructed and operated substantially as described, and applied to gas meters to register the consumption of gas as set forth.

THOMAS I. PITT. [L. S.]

Witnesses:
C. A. DURGIN,
D. G. ROULANDS.